(12) United States Patent
Sumitomo et al.

(10) Patent No.: US 7,943,684 B2
(45) Date of Patent: May 17, 2011

(54) PROCESS FOR PRODUCTION OF BLACK CRAYON

(75) Inventors: Kotaro Sumitomo, Sijonawate (JP); Masamitsu Takahashi, Sijonawate (JP); Hidetoshi Fukuo, Yao (JP)

(73) Assignee: Sakura Color Products Corporation, Osaka (JP)

( * ) Notice: Subject to any disclaimer, the term of this patent is extended or adjusted under 35 U.S.C. 154(b) by 97 days.

(21) Appl. No.: 12/373,130

(22) PCT Filed: Jul. 9, 2007

(86) PCT No.: PCT/JP2007/063676
§ 371 (c)(1),
(2), (4) Date: Feb. 24, 2009

(87) PCT Pub. No.: WO2008/007642
PCT Pub. Date: Jan. 17, 2008

(65) Prior Publication Data
US 2009/0247668 A1    Oct. 1, 2009

(30) Foreign Application Priority Data

Jul. 12, 2006  (JP) .................................. 2006-191473

(51) Int. Cl.
*C09D 13/00* (2006.01)
(52) U.S. Cl. ...................................................... 523/164
(58) Field of Classification Search .................... 523/164
See application file for complete search history.

(56) References Cited

U.S. PATENT DOCUMENTS

| | | |
|---|---|---|
| 4,212,786 A | 7/1980 | Murakami |
| 4,221,772 A | 9/1980 | Eisenmenger et al. |
| 6,203,910 B1 | 3/2001 | Fukuo et al. |
| 6,451,100 B1 | 9/2002 | Karl et al. |
| 2009/0326096 A1 | 12/2009 | Sumitomo et al. |

FOREIGN PATENT DOCUMENTS

| | | |
|---|---|---|
| JP | 52-34825 A | 3/1977 |
| JP | 54-81925 A | 6/1979 |
| JP | 54-23619 B2 | 8/1979 |
| JP | 55-17416 B2 | 10/1980 |
| JP | 8-120209 | 5/1996 |
| JP | 8-245916 | 9/1996 |
| JP | 2001-254043 | 9/2001 |
| JP | 2004-189951 A | 7/2004 |
| JP | 2004-352741 | 12/2004 |
| JP | 2004-240030 | 9/2005 |
| JP | 2006-57083 | 3/2006 |
| JP | 2006-57083 A | 3/2006 |
| WO | WO2006/093248 | 9/2006 |

OTHER PUBLICATIONS

MDI @ http://www.moderndispersions.com/images/PLACE%20HOLDER%20FOR%20DISPERSION.pdf (Sep. 8, 2010).*
International Search Report of PCT/JP2007/063679, dated Aug. 21, 2007.
International Search Report of PCT/JP2007/066771, dated Nov. 6, 2007.
PTO Form 892 issued in the Office Action for U.S. Appl. No. 12/439,455, mail date: Nov. 12, 2010.

* cited by examiner

*Primary Examiner* — David Wu
*Assistant Examiner* — Vu A Nguyen
(74) *Attorney, Agent, or Firm* — Hamre, Schumann, Mueller & Larson, P.C.

(57) ABSTRACT

The invention provides a process for producing a crayon without poor gelation using a benzylidene sorbitol gelling agent together with the use of carbon black as a black pigment. The process comprises dissolving and dispersing carbon black and a resin component in an organic solvent, dissolving at least one gelling agent selected from the group consisting of dibenzylidene sorbitol, tribenzylidene sorbitol and derivatives thereof in the resultant under heating, pouring the obtained raw material solution into a molding container, and then cooling and solidifying the solution, wherein carbon black having an average particle diameter of primary particles of 20 to 100 nm is used as the carbon black.

7 Claims, No Drawings

PROCESS FOR PRODUCTION OF BLACK CRAYON

TECHNICAL FIELD

The present invention relates to a process for producing a black crayon, and more particularly, to a process for producing a crayon without poor gelation using a benzylidene sorbitol gelling agent together with the use of carbon black as a black pigment.

BACKGROUND ART

As a process for production of a crayon, a method has been conventionally known which involves adding a resin component to an appropriate organic solvent, stirring the mixture to prepare a solution, adding thereto a colorant and dissolving or dispersing the colorant therein to form a solution or a dispersion, adding thereto a benzylidene sorbitol gelling agent, such as dibenzylidene sorbitol, and dissolving the gelling agent therein under heating, pouring the resultant into a molding container having a cylindrical shape, for example, and then cooling and solidifying the same (see Patent Literature 1).

As another example of a process for production of a crayon using a benzylidene sorbitol gelling agent together with the use of carbon black as a colorant, a method has been known which involves dissolving a first resin component in an organic solvent, adding carbon black to the obtained resin solution and dispersing the carbon black therein, adding a benzylidene sorbitol gelling agent to the solution under heating and dissolving the gelling agent therein, adding thereto a second resin component at the same temperature and dissolving the second resin component therein, pouring the solution thus obtained into a molding container, and cooling and solidifying the resultant (see Patent Literature 2).

In producing a crayon using the benzylidene sorbitol compound as a gelling agent together with the use of carbon black as a black pigment in particular in a manner as described above, poor gelation frequently occurs in a final gelling process, resulting in that a crayon cannot be stably produced. More specifically, in the production of a crayon, a resin component and carbon black are dissolved and dispersed, respectively, in an organic solvent, a benzylidene sorbitol gelling agent is dissolved in the resultant under heating to prepare a raw material solution, the raw material solution is poured into a molding container, depending on the case, while continuously heating the raw material solution so that the gelling agent remains dissolved in the raw material solution, and when the solution is cooled and solidified, it frequently happens that the gelling agent does not function, resulting in poor gelation.

When a heating time for dissolving the gelling agent is short, it is difficult to uniformly dissolve the gelling agent in an organic solvent, and thus a homogeneous crayon cannot be obtained. On the other hand, when a heating time is long, poor gelation occurs when the obtained raw material solution is poured into a molding container and, cooled and solidified. The crayon thus obtained does not have a required gel hardness, and thus the crayon is easy to collapse in writing, resulting in difficulty of writing. Depending on the case, the solution does not gel, and thus a crayon cannot be obtained.

Patent Literature 1: Japanese Patent Publication No. 54-23619
Patent Literature 2: Japanese Patent Publication No. 55-41716

DISCLOSURE OF THE INVENTION

Technical Problems to be Solved

The invention has been made to solve the above-described problems involved in producing a crayon using a benzylidene sorbitol gelling agent together with the use of carbon black as a black pigment. Therefore, it is an object of the invention to provide a process for producing a crayon without poor gelation.

Means to Solve the Problems

The invention provides a process for producing a crayon comprising dissolving and dispersing carbon black and a resin component in an organic solvent, dissolving, under heating, at least one gelling agent selected from the group consisting of dibenzylidene sorbitol, tribenzylidene sorbitol and derivatives thereof in the resultant, pouring the obtained raw material solution into a molding container, and then cooling and solidifying the solution, wherein carbon black having an average particle diameter of primary particles of 20 to 100 nm is used as the carbon black.

Effect of the Invention

According to the invention, in the production of a crayon by dissolving and dispersing carbon black and a resin component in an organic solvent, dissolving the benzylidene sorbitol gelling agent in the resultant under heating, pouring the obtained raw material solution into a molding container, and then cooling and solidifying the solution, carbon black having an average particle diameter of primary particles of from 20 to 100 nm is used as the above-mentioned carbon black so that a crayon is stably produced without poor gelation.

BEST MODE FOR CARRYING OUT THE INVENTION

In the process for production of a crayon of the invention, the organic solvent used is not particularly limited, and at least one selected from the group consisting of alcohols, glycols, glycol ethers, and glycol ether esters is preferably used. Specific examples of such a preferable organic solvent include: alcohols, such as methanol, ethanol, isopropyl alcohol, 3-methyl-3-methoxybutanol, and 3-methoxy-1-butanol; glycols, such as ethylene glycol, propylene glycol, diethylene glycol, and dipropylene glycol; glycol ethers, such as methyl ether, ethyl ether, propyl ether, butyl ether, and phenyl ether of the above-mentioned glycols; and glycol ether esters such as acetates of the above-mentioned glycol ethers.

Among the above, at least one selected from the group consisting of 3-methyl-3-methoxybutanol, ethylene glycol monobutyl ether, propylene glycol monomethyl ether, propylene glycol monopropyl ether, propylene glycol monobutyl ether, and dipropylene glycol monomethyl ether is particularly preferably used.

The amount of the organic solvent used is suitably determined depending on the other components, such as a colorant. The organic solvent is used usually in an amount of from 20 to 80% by weight, and preferably 30 to 65% by weight, based on the weight of crayon. When the amount of the organic solvent is excessively large, there is a possibility that it becomes difficult to integrally gel the necessary components. On the other hand, when the amount of the organic solvent is excessively small, it becomes difficult to dissolve the necessary components, resulting in a possibility that a uniform gel cannot be formed.

The gelling agent is a component for integrating the components into a solid. As such a gelling agent, at least one selected from the group consisting of dibenzylidene sorbitol, tribenzylidene sorbitol and derivatives thereof is preferably used.

Examples of derivatives of dibenzylidene sorbitol include compounds in which a benzene nucleus in a benzylidene group of dibenzylidene sorbitol is substituted with an alkyl group having 1 to 3 carbon atoms or a halogen atom at an arbitrary position. Specific examples thereof include [di(p-methyl benzylidene)]sorbitol, [di(m-ethyl benzylidene)]sorbitol, and [di(p-chlorobenzylidene)]sorbitol.

Examples of derivatives of tribenzylidene sorbitol include compounds in which a benzene nucleus in a benzylidene group of tribenzylidene sorbitol is substituted with an alkyl group having 1 to 3 carbon atoms or a halogen atom at an arbitrary position. Specific examples thereof include [tri(p-methyl benzylidene)]sorbitol, [tri(m-ethyl benzylidene)]sorbitol, and [tri(p-chlorobenzylidene)]sorbitol. The above-mentioned gelling agents can be used singly or in combination of two or more.

The gelling agent is used usually in an amount of from 2 to 20% by weight, and preferably from 3 to 10% by weight, based on the weight of crayon. It is not preferable to use an excessively large amount of the gelling agent because the gel hardness of crayon obtained is too high, and thus the colorability decreases in writing. On the contrary, when the amount of the gelling agent is excessively small, it becomes difficult to integrally gel the components in the production of crayon.

In the process for production of a crayon according to the invention, such carbon black that has an average particle diameter of primary particles of from 20 to 100 nm, preferably from 25 to 70 nm, is used as a colorant, and such carbon black is used in an amount of from 2 to 50% by weight based on the weight of crayon. When the amount of the carbon black is less than 2% by weight, the crayon obtained makes no sufficient color development. However, when the amount of carbon black exceeds 50% by weight, the relative amounts of the other components other than the colorant are excessively low in the crayon obtained, and thus the functions of the components are not fully demonstrated. Thus, the crayon of the invention excellent in performance cannot be obtained. Moreover, in the production of crayon, the viscosity of the raw material solution mentioned hereinbefore is excessively high, which makes it difficult to pour the solution into a molding container. The optimum amount of carbon black is in the range of from 3 to 40% by weight based on the weight of crayon.

The resin component has generally a function of integrating the components, as well as a function as a fixing agent for writing formed when writing is performed on a writing surface with the crayon obtained. In the process for production of the crayon according to the invention, a film forming resin and an adhesive resin are preferably used in combination as such a resin component.

The film forming resin is intended to increase hardness of crayon and strengthen writing formed on a writing surface, and is not particularly limited insofar as such functions are given. In particular, cellulosic resin, such as cellulose acetate butyrate, ethyl cellulose and acetyl cellulose; vinyl resins, such as polyvinyl butyral resin, polyvinyl acetate resin, vinyl acetate-vinyl chloride copolymer resin, and vinyl acetate-ethylene copolymer resin; and the like, are preferably used. These film forming resins may be used singly or in combination of two or more.

On the other hand, the adhesive resin is intended to increase adhesion of writing formed with the crayon of the invention to a writing surface, and is not particularly limited insofar as such functions are given. In usual, ketone resin, xylene resin, polyamide resin, acrylic resin, maleic resin, terpene phenolic resin, alkylphenolic resin, and the like, are generally used. Furthermore, rosin ester and hydrogenated rosin ester are also used similarly as the adhesive resin. Examples of ketone resin include a condensate of cyclohexane and formaldehyde. Examples of xylene resin include a condensate of m-xylene and formaldehyde. Examples of polyamide resin include a thermoplastic resin obtained by condensation polymerization of dimer acid and diamine or polyamine and having a molecular weight of about 4,000 to 9,000. Examples of an acrylic resin include thermoplastic polyacrylic acid ester. These adhesive resins may also be used singly or in combination of two or more.

The ratio of the film forming resin and the adhesive resin is suitably determined depending on the other components. The weight ratio of the film forming resin:the adhesive resin is generally about 1:0.1 to 5, and preferably about 1:0.2 to 3. Further, the film forming resin and the adhesive resin are used in all usually in an amount of from 3 to 40% by weight, preferably from 6 to 35% by weight, based on the weight of crayon. When the amount of the resin component is excessively large, the gel hardness of crayon obtained is excessively high and colorability and leveling properties are poor. On the contrary, when the amount of the resin component is excessively small, it becomes difficult to integrally gel the components in the production of crayon and the crayon obtained has no sufficient fixability and strength.

In the process for production of crayon according to the invention, in addition to the above-mentioned components, other components which are conventionally known as additives in a crayon, such as an anticorrosive agent, a filler, a leveling agent, a viscosity controlling agent, a structural viscosity imparting agent, and a dryness imparting agent, may be suitably used as required. Moreover, plasticizers, such as diethyl phthalate, dibutyl phthalate, dioctyl phthalate, butyl benzyl phthalate, 2-ethylhexyl epoxy hexahydrophthalate, 2-ethylhexyl sebacate, and tricresyl phosphate may also be used suitably.

According to the process of the invention, the crayon is preferably produced as follows using the above-mentioned components. More specifically, first, the film forming resin is added to and dissolved in the organic solvent under heating, as required, the carbon black is added to the obtained solution and sufficiently dispersed therein with a mill or the like, and then the adhesive resin is added to the resultant and dissolved therein. To the solution thus obtained containing the resin and the carbon black, the gelling agent is finally added and is dissolved therein under heating thereby to obtain a raw material solution. The raw material solution is poured into a molding container having a desired shape while continuously heating the raw material solution so that the gelling agent remains dissolved in the raw material solution, as required, and then the raw material solution is cooled and solidified, thereby providing the crayon of the invention having the desired shape.

According to the invention, by using such carbon black that has an average particle diameter of primary particles of from 20 to 100 nm, even when the gelling agent is added to the solution containing the resin and the carbon black and heating the resultant over a long period of time so as to dissolve the gelling agent, or even when the raw material solution is continuously heated over a long period of time so that the gelling agent remains dissolved in the raw material solution after dissolving the gelling agent therein, the raw material solution can be stably gelled without poor gelation.

The gel hardness of crayon obtained in this way can be suitably adjusted depending on the type and proportion of the organic solvent, the gelling agent, the resin, etc. used, and is suitably determined according to the intended use, and is generally from about 5 to 50 kg/cm$^2$, and preferably from 7 to 30 kg/cm$^2$.

EXAMPLES

The invention will be described with reference to the following examples and comparative examples, but the invention is not limited thereto. In the following, carbon black #30 manufactured by Mitsubishi Chemical Corporation was used as carbon black having an average particle diameter of primary particles of 30 nm, carbon black #25 manufactured by Mitsubishi Chemical Corporation was used as carbon black having an average particle diameter of primary particles of 47 nm, Printex G manufactured by Degussa AG was used as carbon black having an average particle diameter of primary particles of 51 nm, and Printex 75 manufactured by Degussa AG was used as carbon black having an average particle diameter of primary particles of 17 nm.

Example 1

A mixed solvent composed of 12.0 parts by weight of ethylene glycol monobutyl ether, 18.0 parts by weight of propylene glycol n-butyl ether, and 20.0 parts by weight of dipropylene glycol monomethyl ether was heated to 30° C., and 5.0 parts by weight of dibutyl phthalate was dissolved therein. Then, 13.0 parts by weight of polyvinyl butyral resin (MOWITAL B-20H, manufactured by Kuraray Co., Ltd., and having an average degree of polymerization of about 300) and 6.0 parts by weight of polyvinyl butyral resin (MOWITAL B-30H, manufactured by Kuraray Co., Ltd., and having an average degree of polymerization of about 500) were dissolved.

5.0 parts by weight of carbon black (#30, manufactured by Mitsubishi Chemical Corporation) having an average particle diameter of primary particles of 30 nm was added to and dispersed in the resin solution thus obtained while heating the resin solution at a temperature of 30° C. Then, 15.0 parts by weight of ketone resin ("Highlack 111" manufactured by Hitachi Chemical Co., Ltd.) was added to and dissolved in the solution while the solution was heated at a temperature of 130° C.

6.0 parts by weight of dibenzylidene sorbitol ("GELOL D", a gelling agent manufactured by New Japan Chemical Co., Ltd.) was added to and dissolved in the solution thus obtained containing the resin and the carbon black while heating the solution at a temperature of 130° C., to thereby obtain a raw material solution. The raw material solution thus obtained was poured into a cylindrical molding container, and was allowed to cool to a room temperature and was solidified. Then, the solidified substance was taken out, as a crayon, from the container.

Examples 2 to 4

Crayons were obtained in the same manner as in Example 1, except using the components shown in Table 1 in the amounts shown in Table 1.

Comparative Examples 1 and 2

Crayons were obtained in the same manner as in Example 1, except using the components shown in Table 1 in the amounts shown in Table 1.

When each crayon was produced as described above, the degree of gelation of the raw material solutions after 1 hour and 3 hours from the addition of dibenzylidene sorbitol to the solution containing the resin and the carbon black, respectively, were visually observed. The case where the obtained crayon had an expected gel hardness was defined as A, the case where the obtained crayon was not sufficiently gelled and was excessively soft was defined as B, and the case where the raw material solution was not gelled and no crayon was obtained was defined as C. The results are shown in Table 1.

TABLE 1

|  | Examples | | | | Comparative | |
| --- | --- | --- | --- | --- | --- | --- |
|  | 1 | 2 | 3 | 4 | 1 | 2 |
| Solvent | | | | | | |
| Butyl cellosolve | 12.0 | 12.0 | 12.0 | 12.0 | 12.0 | 12.0 |
| Propylene glycol mono-n-butyl ether | 18.0 | 18.0 | 18.0 | 18.0 | 18.0 | 18.0 |
| Dipropylene glycol monomethyl ether | 20.0 | 20.0 | 20.0 | 20.0 | 20.0 | 20.0 |
| Colorant (Carbon Black) | | | | | | |
| Average particle diameter of primary particles: 30 nm | 5.0 | | | 2.0 | | 2.0 |
| Average particle diameter of primary particles: 47 nm | | 5.0 | | | | |
| Average particle diameter of primary particles: 51 nm | | | 5.0 | 3.0 | | |
| Average particle diameter of primary particles: 17 nm | | | | | 5.0 | 5.0 |
| Resin Component | | | | | | |
| Polyvinyl butyral resin | | | | | | |
| Average polymerization degree of about 300 | 13.0 | 13.0 | 13.0 | 13.0 | 13.0 | 13.0 |
| Average polymerization degree of about 500 | 6.0 | 6.0 | 6.0 | 6.0 | 6.0 | 6.0 |
| Ketone resin | 15.0 | 15.0 | 15.0 | 15.0 | 15.0 | 15.0 |
| Gelling Agent | 6.0 | 6.0 | 6.0 | 6.0 | 6.0 | 6.0 |
| Plasticizer | 5.0 | 5.0 | 5.0 | 5.0 | 5.0 | 5.0 |
| Degree of Gelation | | | | | | |
| After 1 hour from addition of gelling agent | A | A | A | A | C | B |
| After 3 hours from addition of gelling agent | A | A | A | A | C | C |

The invention claimed is:

1. A process for producing a crayon, comprising:
dissolving and dispersing carbon black and a resin component in an organic solvent, thereby obtaining a first solution,
dissolving at least one gelling agent selected from the group consisting of dibenzylidene sorbitol, tribenzylidene sorbitol, a derivative of dibenzylidene sorbitol and a derivative of tribenzylidene sorbitol in the first solution under heating, thereby obtaining a second solution,
pouring the second solution into a molding container while continuously heating the second solution so that the gelling agent remains dissolved in the second solution, and
cooling and gelling the second solution,
wherein the carbon black has an average particle diameter of primary particles of from 20 to 100 nm, and the carbon black is present in an amount of 2-50% by weight based on the total weight of the crayon.

2. The process for producing a crayon according to claim 1, wherein the resin component comprises a combination of a film forming resin and an adhesive resin, the film forming resin being at least one selected from the group consisting of cellulosic resin, polyvinyl butyral resin, polyvinyl acetate resin, vinyl acetate-vinyl chloride copolymer resin, and vinyl acetate-ethylene copolymer resin, and the adhesive resin being at least one selected from the group consisting of ketone resin, xylene resin, polyamide resin, acrylic resin, maleic resin, terpene phenolic resin and alkylphenolic resin.

3. The process for producing a crayon according to claim 2, wherein the weight ratio of the film forming resin:the adhesive resin is 1:0.1 to 1:5.

4. The process for producing a crayon according to claim 2, wherein the film forming resin and the adhesive resin are used in all in an amount of 3 to 40% by weight based on the total weight of the crayon.

5. The process for producing a crayon according to claim 1, wherein the carbon black is used in an amount of from 3 to 40% by weight based on the total weight of the crayon.

6. The process for producing a crayon according to claim 1, wherein the organic solvent is at least one selected from ethylene glycol monobutyl ether, propylene glycol monopropyl ether, propylene glycol monobutyl ether, dipropylene glycol monomethyl ether and 3-methyl-3-methoxybutanol.

7. The process for producing a crayon according to claim 1, wherein the average particle diameter of the primary particles is from 25 to 70 nm.

* * * * *